United States Patent
Koon

(10) Patent No.: US 9,978,317 B2
(45) Date of Patent: May 22, 2018

(54) ELECTRO-OPTIC MIRROR HAVING USER-ADUSTABLE DIMMING WITH VISUAL FEEDBACK

(71) Applicant: Gentex Corporation, Zeeland, MI (US)

(72) Inventor: Roger D. Koon, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days. days.

(21) Appl. No.: 15/288,122

(22) Filed: Oct. 7, 2016

(65) Prior Publication Data

US 2017/0103712 A1 Apr. 13, 2017

Related U.S. Application Data

(60) Provisional application No. 62/239,323, filed on Oct. 9, 2015.

(51) Int. Cl.
| | |
|---|---|
| G09G 5/00 | (2006.01) |
| G09G 3/34 | (2006.01) |
| G09G 3/38 | (2006.01) |
| G02F 1/157 | (2006.01) |
| B60R 1/08 | (2006.01) |
| B60R 1/12 | (2006.01) |

(52) U.S. Cl.
CPC .......... *G09G 3/3406* (2013.01); *B60R 1/088* (2013.01); *G02F 1/157* (2013.01); *G09G 3/38* (2013.01); *B60R 2001/1215* (2013.01); *B60R 2001/1223* (2013.01); *G09G 2320/0626* (2013.01); *G09G 2354/00* (2013.01); *G09G 2360/144* (2013.01); *G09G 2380/10* (2013.01)

(58) Field of Classification Search
CPC ........ G09G 3/3406; G09G 3/38; G02F 1/157; B60R 1/088
See application file for complete search history.

(56) References Cited

U.S. PATENT DOCUMENTS

| | | | |
|---|---|---|---|
| 5,928,572 | A | 7/1999 | Tonar et al. |
| 5,998,617 | A | 12/1999 | Srinivasa et al. |
| 6,020,987 | A | 2/2000 | Baumann et al. |

(Continued)

FOREIGN PATENT DOCUMENTS

| | | |
|---|---|---|
| WO | 9842796 | 10/1998 |
| WO | 9902621 | 1/1999 |

*Primary Examiner* — Kent Chang
*Assistant Examiner* — Mark Edwards
(74) *Attorney, Agent, or Firm* — Price Heneveld LLP; Bradley D. Johnson

(57) ABSTRACT

A rearview mirror assembly for a vehicle includes an electro-optic mirror element that reflects images from the rear of the vehicle, wherein the reflected images may be dimmed in response to a detection of glare from trailing vehicle; a display positioned behind the mirror element for displaying images of a rearward scene; a user input for receiving user adjustment of an extent to which the mirror element is to be dimmed to reduce glare from trailing vehicles; and a processor coupled to the mirror element and the user input for adjusting the extent to which the mirror element is dimmed in response to user adjustment via the user input. Wherein, when user adjustment is made via the user input, the processor causes simulated images of vehicle headlights to be displayed on the display where the simulated images are dimmed to a level selected by the user.

20 Claims, 3 Drawing Sheets

(56) References Cited

U.S. PATENT DOCUMENTS

| | | | |
|---|---|---|---|
| 6,037,471 | A | 3/2000 | Srinivasa et al. |
| 6,137,620 | A | 10/2000 | Guarr et al. |
| 6,141,137 | A | 10/2000 | Byker et al. |
| 6,193,912 | B1 | 2/2001 | Thieste et al. |
| 6,241,916 | B1 | 6/2001 | Claussen et al. |
| 6,249,369 | B1 | 6/2001 | Theiste et al. |
| 6,519,072 | B2 | 2/2003 | Nishikitani et al. |
| 6,700,692 | B2 | 3/2004 | Tonar et al. |
| 8,339,526 | B2 | 12/2012 | Minikey, Jr. et al. |
| 2002/0005999 | A1 | 1/2002 | Hutzel et al. |
| 2009/0096937 | A1 | 4/2009 | Bauer et al. |
| 2010/0085645 | A1 | 4/2010 | Skiver et al. |
| 2010/0253597 | A1* | 10/2010 | Seder ............... B60R 1/00 345/7 |
| 2010/0277786 | A1* | 11/2010 | Anderson ........... B60R 1/088 359/247 |
| 2014/0022390 | A1* | 1/2014 | Blank ................ B60R 1/12 348/148 |
| 2015/0266427 | A1 | 9/2015 | VanderPloeg et al. |
| 2015/0277203 | A1 | 10/2015 | VanderPloeg et al. |

\* cited by examiner

ELECTRO-OPTIC MIRROR HAVING USER-ADUSTABLE DIMMING WITH VISUAL FEEDBACK

CROSS-REFERENCE TO RELATED APPLICATION

This application claims priority to and the benefit under 35 U.S.C. § 119(e) of United States Provisional Patent Application No. 62/239,323, filed on Oct. 9, 2015, entitled "ELECTRO-OPTIC MIRROR HAVING USER-ADJUSTABLE DIMMING WITH VISUAL FEEDBACK," the entire disclosure of which is hereby incorporated herein by reference.

FIELD OF THE INVENTION

The present invention generally relates to an electro-optic mirror for a vehicle and, more particularly, an electro-optic mirror for a vehicle having a user input for adjusting dimming of the electro-optic element.

SUMMARY OF THE INVENTION

According to one aspect of the present invention, a rearview mirror assembly is provided for a vehicle. The rearview mirror assembly comprises an electro-optic mirror element that reflects images from the rear of the vehicle, wherein the reflected images may be dimmed in response to a detection of glare from headlights of a trailing vehicle; a user input for receiving user adjustment of an extent to which the electro-optic mirror element is to be dimmed to reduce glare light from headlights of trailing vehicles; a processor coupled to the electro-optic mirror element and the user input for adjusting the extent to which the electro-optic mirror element is dimmed in response to user adjustment via the user input; and a display positioned behind the electro-optic mirror element for displaying images of a rearward scene to a driver of the vehicle. Wherein, when user adjustment is made via the user input, the processor causes simulated images of vehicle headlights to be displayed on the display where the simulated images are dimmed to a level selected by the user.

According to another aspect of the present invention, a rearview assembly is provided for a vehicle. The rearview assembly comprises a display for displaying images of a rearward scene to a driver of the vehicle; a user input for receiving user adjustment of an extent to which the displayed images are to be dimmed to reduce glare light from headlights of trailing vehicles; and a processor coupled to the user input and the display for adjusting the extent to which the displayed images are dimmed in response to user adjustment via the user input, wherein, when user adjustment is made via the user input, the processor causes simulated images of vehicle headlights to be displayed where the simulated images are dimmed to a brightness level selected by the user.

According to another aspect, a method is provided for dimming images from a rearview assembly of a vehicle in response to detected glare light. The method comprises: providing a user input for receiving user adjustment of an extent to which the images are to be dimmed to reduce glare light; providing a display positioned in the rearview assembly for displaying images to a user; when user adjustment is made via the user input, displaying simulated images of vehicle headlights on the display where the simulated images are dimmed to a level selected by the user; and when the vehicle is in operation, detecting glare light to the rear of the vehicle, and when the detected glare light exceeds a threshold, dimming the images from the rearview assembly to the level previously selected by the user.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

Figure 1A:
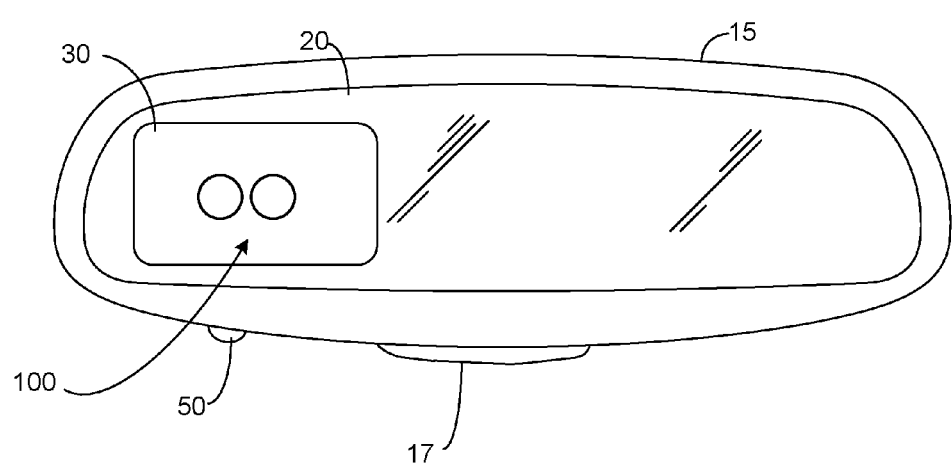
FIG. 1A is a front perspective view of a rearview mirror assembly incorporating an electro-optic mirror element according to one embodiment.

The present illustrated embodiments reside primarily in combinations of method steps and apparatus components related to a rearview assembly. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus.

Rearview mirror assemblies are known for use in vehicles that include an electro-optic element, such as an electrochromic mirror element, that automatically selectively attenuates light that reflects off the mirror in order to reduce excessive glare that may be caused by, for example, bright headlamps of a trailing vehicle at nighttime. Headlamps from a trailing vehicle generally only cause excessive glare during nighttime or dark conditions in which the driver's eyes adapt to the dark ambient light levels. Thus, such known mirror assemblies typically include an ambient light sensor so that when the ambient light is bright, the auto-dimming feature is disabled, and when the ambient light is dark, auto-dimming is enabled. At nighttime, when headlights are reflected from the rearview mirror, the brightness of the headlamps can appear excessively bright and distract the driver. Thus, electrochromic mirrors also utilize a glare light sensor for sensing glare light that is impinging upon the mirror surface and hence reflected towards the eyes of the driver. Electrochromic mirror elements change color in response to an applied voltage level so as to darken and thereby attenuate impinging light prior to striking a reflective layer and after it is reflected from the reflecting layer towards the eyes of the driver. Thus, the electrochromic mirror "dims" when excessive glare with light levels is detected by the glare light sensor, which faces rearward from the mirror assembly. Electrochromic mirror elements dim sufficiently to change the perceived brightness of the headlamps such that the driver may still notice the headlamps and yet not be distracted by an overly bright reflected image of the headlamps.

Prior electrochromic mirror assemblies have been constructed that include a user input so as to allow a user to adjust the extent to which the electrochromic mirror element dims in response to a given glare light level. However, such a user input has led to customer confusion as a result of the customers adjusting the extent of dimming when actual glare light was inadequate at the time of adjustment, and thus customers either over or under adjust the electrochromic mirror element dimming capacity. As a result, electrochromic mirror elements have typically not included the ability for a user to adjust the extent of dimming. Further, electrochromic mirror elements do not dim immediately. Accordingly, even when glare light is present at the time of adjustment, a user would not get immediate feedback as to the extent to which the dimming level has been adjusted.

Figure 1B:
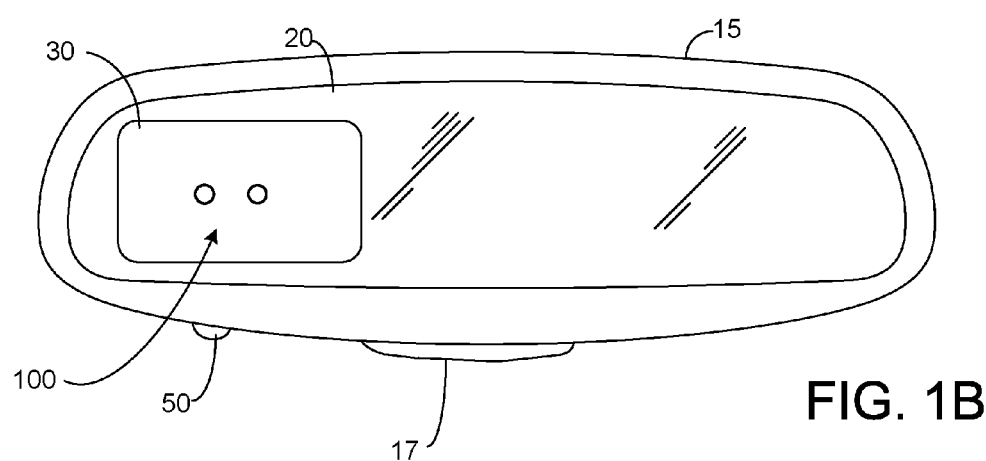
FIG. 1B is another front perspective view of the rearview mirror assembly shown in FIG. 1A.
Figure 2:
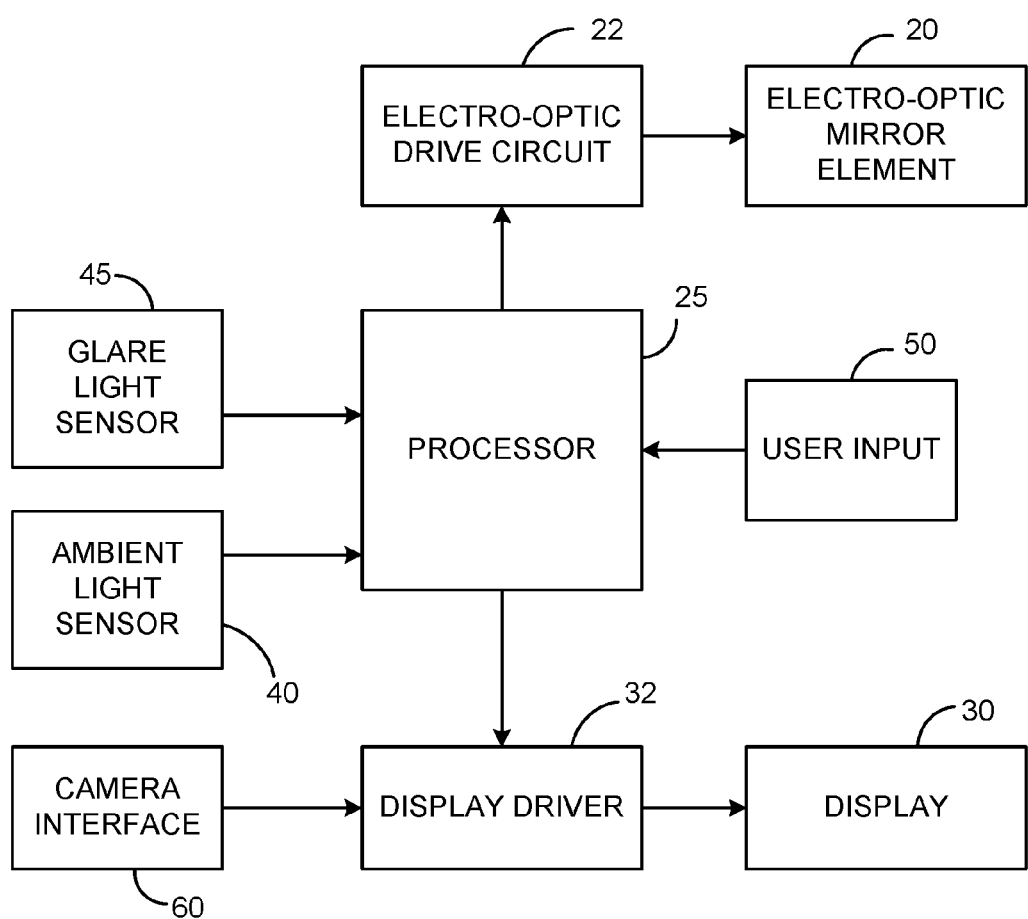
FIG. 2 is an electrical circuit diagram in block form showing an electrical circuit for use in the rearview mirror assembly shown in FIGS. 1A and 1B.

The embodiments described herein address the issues involved with providing user input for adjusting the extent of mirror dimming by providing a mechanism for feedback to the user so that the user may see how much of an adjustment the user is making at the time of adjustment. More specifically, as shown in FIGS. 1A, 1B, and 2, a rearview assembly 10 is provided that includes a glare light sensor 45 for detecting glare light from a rearward direction, an electro-optic mirror element 20 that reflects images from the rear of the vehicle, where the reflected images may be dimmed in response to a detection of glare from headlights of a trailing vehicle, a display 30 positioned behind the electro-optic mirror element 20 for displaying images of a rearward scene to a driver of the vehicle, a user input 50 for receiving user adjustment of an extent to which the electro-optic mirror element 20 is to be dimmed to reduce glare from headlights of trailing vehicles, and a processor 25 in communication with electro-optic mirror element 20, user input 50, glare light sensor 45, and display 30 for adjusting the extent to which electro-optic mirror element 20 is dimmed in response to user adjustment via user input 50. When user adjustment is made via user input 50, processor 25 causes simulated images 100 of vehicle headlights to be displayed on display 30 where the simulated images 100 are dimmed to a level selected by the user. Note that FIG. 1B shows a simulated image 100 in which the headlamps are dimmer relative to the headlamps in the simulated image 100 shown in FIG. 1A. In this manner, visual feedback may be provided to the user at the time at which the adjustments are made. Accordingly, the user may make a more informed adjustment of the dimming level of the electrochromic mirror element 20 while viewing this visual feedback. Further, the visual feedback may be immediate insofar as it is provided by the display 30 rather than by actually dimming the electro-optic element 20.

User input 50 may take any form including pushbuttons or slider switches, or can be part of a touch screen provided on the surface of the mirror element 20.

Rearview mirror assembly 10 may further include an ambient light sensor 40 for sensing an ambient light level. Processor 25 may receive this ambient light level from sensor 40 and select simulated images to display in response to the ambient light level. This allows the simulated image to have a brightness that produces the same relative level of glare as would be experienced at night. In other words, the brighter the ambient light level, the brighter the simulated image 100.

As shown in FIGS. 1A and 1B, rearview mirror assembly 10 may further include a housing 15 in which all the previously described components are housed, as well as a mirror mount 17 for mounting mirror assembly 10 to the windshield or headliner of the vehicle.

As shown in FIG. 2, rearview mirror assembly 10 may further include an electro-optic drive circuit 22 that provides a voltage level to the electro-optic mirror element 20 as commanded by processor 25. Further, a display driver 32 may be provided for causing selected images, including simulated images 100 to be displayed on display 30 as commanded by processor 25. A camera interface 60 may also be provided for receiving images or a video stream from a camera or multiple cameras mounted to the vehicle.

Rearview mirror assemblies are also known that include a display for displaying images captured by a camera at the rear of the vehicle to assist in backing up the vehicle. Such rearview mirror assemblies have also been known to include electrochromic mirror elements positioned in front of these displays. Examples of mirror assemblies with a reverse camera display are disclosed in U.S. Pat. No. 8,339,526 and U.S. Patent Application Publication No. US 2009/0096937 A1, the entire disclosures of which are incorporated herein by reference.

Simulated images 100 may be still images, video images, or animation images where the simulated images show objects (such as headlamps) in various states of brightness so as to simulate the effect of dimming of the mirror element on the reflections of the object. Alternatively, a single simulated image or video stream may be provided where the display brightness is increased or decreased to correspond to the simulated adjustment of the mirror dimming level. Such simulated images 100 may be stored in the internal memory of processor 25 or in external memory. By displaying such simulated images 100, a user may make adjustments via user input 50 and view the effect of the adjustments by looking at the simulated images 100 prior to committing to the change. The electro-optic element 20 is not dimmed during adjustment, but only after the user commits to the change in the adjustment and when excessive glare light is detected. Thus, when the vehicle is in operation, the processor 25 determines whether the detected glare light exceeds a threshold, and dims the electro-optic mirror element 20 to the level previously selected by the user.

It is also possible that the ability to adjust the extent of dimming may be conditioned upon certain conditions. For example, the ability to adjust the extent of dimming may be disabled upon detection that the vehicle is moving or shifted out of park.

Electro-optic mirror element 20 may be configured to include any of the partially reflective, partially transmissive ("transflective") coatings disclosed in U.S. Pat. No. 6,700,692, the entire disclosure of which is incorporated herein by reference. Such a coating may be transflective and cover the entire rear surface of mirror element 20 or may be highly reflective and substantially non-transmissive in some areas of mirror element 20 while being partially reflective and partially transmissive only in the area in front of display 30 (if display 30 is smaller than the viewing area of mirror element 20).

Electro-optic mirror element 20 may be an electrochromic mirror element. Examples of electrochromic mirror elements are disclosed in U.S. Pat. No. 6,700,692, the entire disclosure of which is incorporated herein by reference. The electrochromic mirror element may have an electrochromic component that is a single-layer component, single-phase component, multi-layer component, or multi-phase component, as described in U.S. Pat. Nos. 5,928,572; 5,998,617; 6,020,987; 6,037,471; 6,141,137; 6,241,916; 6,193,912; 6,249,369; 6,137,620; and 6,519,072; and International Patent Application Ser. Nos. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES" and PCT/EP98/03862 entitled "ELECTROCHROMIC POLYMER SYSTEM," which are herein incorporated by reference in their entirety.

Figure 3A:
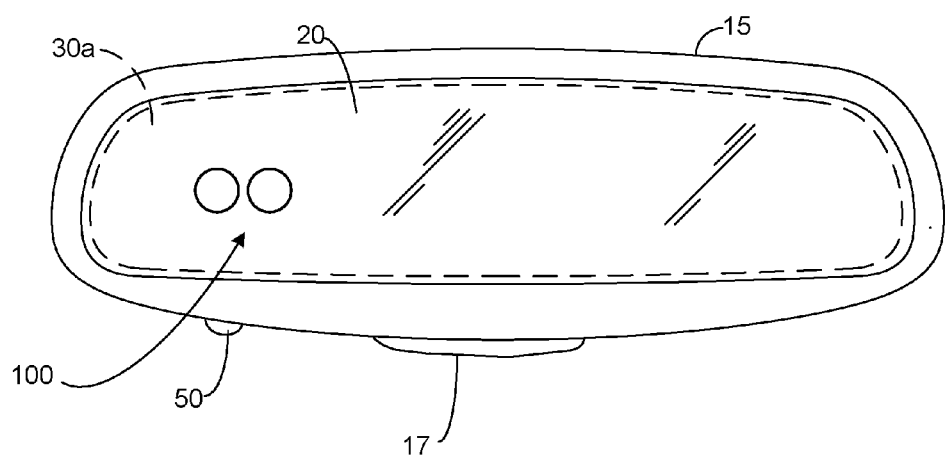
FIG. 3A is a front perspective view of a rearview assembly incorporating an electro-optic mirror element according to another embodiment.
Figure 3B:
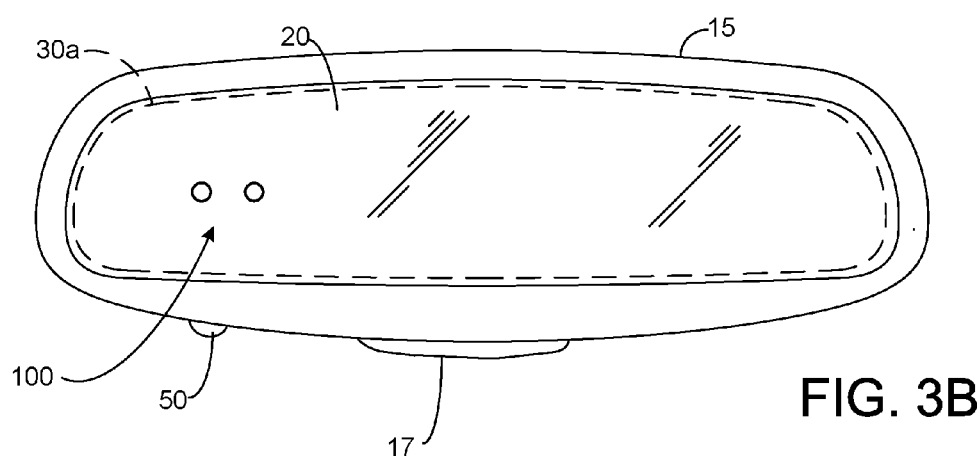
FIG. 3B is another front perspective view of the rearview assembly shown in FIG. 3A.

Although display 30 is shown to only be sized for showing a rear camera display to assist with vehicle back-up in FIGS. 1A and 1B, the display may span substantially the entire area of a viewing surface of the rearview assembly and function as a full display 30a as shown in FIGS. 3A and 3B. Examples of full display mirror assemblies are disclosed in U.S. patent application Publication Nos. U.S. 2015/0277203 A1 and US 2015/0266427 A1, the entire disclosures of which are incorporated herein by reference. Full display 30a is typically used during both forward and reverse operation of the vehicle to display the rearward images. In a rearview assembly 10a with a full display 30a, the rearward image seen by the driver is the image shown by display 30a rather than a reflected image. Thus, a reduction in glare light may be achieved by dimming an electro-optic element 20 positioned in front of display 30a, and/or by dimming the brightness of the images shown by display 30a. In the former case, the dimming is carried out in the same manner as set forth above with the back-up assist display 30. In the latter case, the user input 50 receives user adjustment of an extent to which the displayed images are to be dimmed to reduce glare light from headlights of trailing vehicles, and the processor 25 adjusts the extent to which the displayed images are dimmed in response to user adjustment via user input 50. When user adjustment is made via user input 50, processor 25 causes simulated images of vehicle headlights to be displayed where the simulated images are dimmed to a brightness level selected by the user. The brightness of the simulated images may be adjusted in response to the ambient light level sensed by ambient light sensor 40. The glare light level may subsequently be sensed using glare light sensor 45 or the images obtained from the rear camera. When the vehicle is in operation, processor 25 determines whether the detected glare light exceeds a threshold, and dims the displayed images of the rearward scene to the brightness level previously selected by the user. It should be noted that a rearview device having a full display 30a may be manually or automatically toggled between a display mode where the full display 30a provides the rearward image and a mirror mode where the mirror element provides the rearward image by reflection.

Although two embodiments are disclosed including displays of two sizes, the size and shape of the display may be varied without departing from the scope of the embodiments disclosed herein.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A rearview mirror assembly for a vehicle, the rearview mirror assembly comprising:
    an electro-optic mirror element that reflects images from the rear of the vehicle, wherein the reflected images may be dimmed in response to a detection of glare light from headlights of a trailing vehicle;
    a user input for receiving user adjustment of an extent to which the electro-optic mirror element is to be dimmed to reduce glare light from headlights of trailing vehicles;
    a processor coupled to the electro-optic mirror element and the user input for adjusting the extent to which the electro-optic mirror element is dimmed in response to user adjustment via the user input; and
    a display positioned behind the electro-optic mirror element for displaying images of a rearward scene to a driver of the vehicle, wherein,
    when user adjustment is made via the user input, the processor causes simulated images of vehicle headlights to be displayed on the display where the simulated images are dimmed to a level selected by the user and immediately informative of the extent to which the electro-optic mirror element will be dimmed.

2. The rearview mirror assembly of claim 1, and further comprising an ambient light sensor for detecting an ambient light level, wherein the processor is coupled to the ambient light sensor and selects simulated images to display in response to the ambient light level sensed by the ambient light sensor.

3. The rearview mirror assembly of claim 2, wherein the processor selects simulated images of increasing brightness with increasing ambient light levels.

4. The rearview mirror assembly of claim 1, and further comprising a glare light sensor for detecting glare light from a rearward direction, wherein the processor is coupled to the glare light sensor for dimming the electro-optic mirror element in response to the detected glare light.

5. The rearview mirror assembly of claim 1, wherein the display is a full display spanning substantially an entire area of a viewing surface of the rearview mirror assembly.

6. The rearview mirror assembly of claim 1, wherein the display is a back-up assist display.

7. The rearview mirror assembly of claim 1, wherein the electro-optic mirror element is an electrochromic mirror element.

8. The rearview mirror assembly of claim 1, wherein the electro-optic mirror element is transflective.

9. The rearview mirror assembly of claim 1, wherein, when the vehicle is in operation, the processor determines whether the detected glare light exceeds a threshold, and dims the electro-optic mirror element to the level previously selected by the user.

10. A rearview assembly for a vehicle, the rearview assembly comprising:
- a display for displaying images of a rearward scene to a driver of the vehicle;
- a user input for receiving user adjustment of an extent to which the displayed images are to be dimmed to reduce glare light from headlights of trailing vehicles; and
- a processor coupled to the user input and the display for adjusting the extent to which the displayed images are dimmed in response to user adjustment via the user input, wherein,
- when user adjustment is made via the user input, the processor causes simulated images of vehicle headlights to be displayed where the simulated images are dimmed to a brightness level selected by the user and immediately informative of the extent to which the electro-optic mirror element will be dimmed.

11. The rearview assembly of claim 10 and further comprising an electro-optic mirror element that reflects images from the rear of the vehicle, wherein the reflected images may be dimmed in response to a detection of glare light from headlights of a trailing vehicle, and wherein the processor adjusts the extent to which the displayed images are dimmed by dimming the electro-optic mirror element.

12. The rearview assembly of claim 10 and further comprising an ambient light sensor for detecting an ambient light level, wherein the processor is coupled to the ambient light sensor and selects simulated images to display in response to the ambient light level sensed by the ambient light sensor.

13. The rearview assembly of claim 10, wherein, when the vehicle is in operation, the processor determines whether the detected glare light exceeds a threshold, and dims the displayed images of the rearward scene to the brightness level previously selected by the user.

14. The rearview assembly of claim 10, and further comprising a glare light sensor for detecting glare light from a rearward direction, wherein the processor is coupled to the glare light sensor for dimming the displayed images in response to the detected glare light.

15. The rearview assembly of claim 10, wherein the display is a full display spanning substantially an entire area of a viewing surface of the rearview mirror assembly.

16. The rearview assembly of claim 11, wherein the electro-optic mirror element is an electrochromic mirror element.

17. The rearview assembly of claim 11, wherein the electro-optic mirror element is transflective.

18. A method of dimming images from a rearview assembly of a vehicle in response to detected glare light, the method comprising:
- providing a user input for receiving user adjustment of an extent to which the images are to be dimmed to reduce glare light;
- providing a display positioned in the rearview assembly for displaying images to a user;
- when user adjustment is made via the user input, displaying simulated images of vehicle headlights on the display where the simulated images are dimmed to a level selected by the user and immediately informative of the extent to which the electro-optic mirror element will be dimmed; and
- when the vehicle is in operation, detecting glare light to the rear of the vehicle, and when the detected glare light exceeds a threshold, dimming the images from the rearview assembly to the level previously selected by the user.

19. The method of claim 18, wherein the display is a full display for displaying images of rearward scenes, and the images from the rearview assembly that are dimmed are the images displayed by the full display.

20. The method of claim 18, further comprising providing an electro-optic mirror element in the rearview assembly in front of the display, wherein the images from the rearview assembly that are dimmed are images reflected from the electro-optic mirror element.

\* \* \* \* \*